United States Patent [19]

Smith

[11] 3,796,830

[45] Mar. 12, 1974

[54] RECIRCULATING BLOCK CIPHER CRYPTOGRAPHIC SYSTEM

[75] Inventor: John Lynn Smith, Yorktown Heights, N.Y.

[73] Assignee: International Business Machines Corporation, Armonk, N.Y.

[22] Filed: Nov. 2, 1971

[21] Appl. No.: 194,836

[52] U.S. Cl. .................................................. 178/22
[51] Int. Cl. .............................................. H04l 9/02
[58] Field of Search ...................................... 178/22

[56] References Cited

UNITED STATES PATENTS

| | | | |
|---|---|---|---|
| 3,038,028 | 6/1962 | Henze | 178/22 |
| 3,250,855 | 5/1966 | Vasseur | 178/22 |
| 3,657,699 | 4/1972 | Rocher | 178/22 X |
| 3,170,033 | 2/1965 | Vasseur | 178/22 |

*Primary Examiner*—Malcolm F. Hubler
*Attorney, Agent, or Firm*—Victor Siber

[57] ABSTRACT

This is a cryptographic system for enciphering a block of binary data under the control of a subscriber cipher key consisting of a preassigned combination of binary symbols. The block of data is processed on a segmented basis with each segment of data being serially transformed in accordance with control signals determined from the binary values of key segments. The system is utilized within a data processing environment to provide complete privacy of data that is stored, or transmitted within a computer network.

The ciphered message is developed by passing the clear message through a series of nonlinear transformations, each transformation being a function of the binary values that appear in the subscriber key.

9 Claims, 4 Drawing Figures

INVENTOR
JOHN L. SMITH

BY Victor Siber

ATTORNEY

FIG. 2

| ROUND | TRANSFORMATION CONTROL | ADDEND REGISTER | PERMUTATION CONTROL | ADDEND | PERMUTATION | ADDEND | PERMUTATION | ADDEND | PERMUTATION |
|---|---|---|---|---|---|---|---|---|---|
| 1 | 0 | 1 | 2 | 3 | 4 | 5 | 6 | 7 | 8 |
| 2 | 9 | 10 | 11 | 12 | 13 | 14 | 15 | 0 | 1 |
| 3 | 2 | 3 | 4 | 5 | 6 | 7 | 8 | 9 | 10 |
| 4 | 11 | 12 | 13 | 14 | 15 | 0 | 1 | 2 | 3 |
| 5 | 4 | 5 | 6 | 7 | 8 | 9 | 10 | 11 | 12 |
| 6 | 13 | 14 | 15 | 0 | 1 | 2 | 3 | 4 | 5 |
| 7 | 6 | 7 | 8 | 9 | 10 | 11 | 12 | 13 | 14 |
| 8 | 15 | 0 | 1 | 2 | 3 | 4 | 5 | 6 | 7 |
| 9 | 8 | 9 | 10 | 11 | 12 | 13 | 14 | 15 | 0 |
| 10 | 1 | 2 | 3 | 4 | 5 | 6 | 7 | 8 | 9 |
| 11 | 10 | 11 | 12 | 13 | 14 | 15 | 0 | 1 | 2 |
| 12 | 3 | 4 | 5 | 6 | 7 | 8 | 9 | 10 | 11 |
| 13 | 12 | 13 | 14 | 15 | 0 | 1 | 2 | 3 | 4 |
| 14 | 5 | 6 | 7 | 8 | 9 | 10 | 11 | 12 | 13 |
| 15 | 14 | 15 | 0 | 1 | 2 | 3 | 4 | 5 | 6 |
| 16 | 7 | 8 | 9 | 10 | 11 | 12 | 13 | 14 | 15 |

TERMINAL CIPHER/DECIPHER (rounds 1 → 4) · CPU CIPHER/DECIPHER (rounds 16 → 14)

RECIRCULATING BLOCK CIPHER CRYPTOGRAPHIC SYSTEM

CROSS REFERENCE TO RELATED APPLICATIONS

Reference is hereby made to application Ser. No. 158,360, entitled Block Cipher Cryptographic System, and application Ser. No. 158,138, entitled Centralized Verification System, and to application Ser. No. 158,174, entitled Multiple Enciphering System, all assigned to the same assignee as the present application and filed June 30, 1971.

BACKGROUND OF THE INVENTION

With the growing use of remote-access computer networks which provide a large number of subscribers with access to "data banks" for receiving, storing, processing and furnishing information of a confidential nature, the need for data security has received a great deal of attention. Generally, present-day computing centers have elaborate procedures for maintaining physical security at the location where the central processor and data-storage facilities are located. For example, some of the procedures which have been used are restriction of personnel within the computer center, utilization of mechanical keys for activation of equipment, and camera observation. These security procedures, while providing a measure of safety in keeping unauthorized individuals from the physical computing center itself, are not effective with respect to large remote-access computer networks which have many terminals located at distant sites connected by either cable or telecommunication lines.

Some digital techniques have been implemented in computing systems for the purpose of maintaining privacy of data. One such approach is the use of a device generally known as "memory protection". This type of data-security technique associates with various segments of the storage within the central processor a unique binary key. Then, internal to the processor, there are present various protection circuits that check for a match of the binary key for all executable instructions and those sections of storage which are to be accessed. This type of security measure is generally ineffective in protecting information within the computing system from unauthorized individuals who have knowledge of the computing system circuitry, and who can devise sophisticated techniques for illegally obtaining unauthorized data.

In the field of communications, cryptography has long been recognized as a means of achieving security and privacy. Various systems have been developed in prior art for encrypting messages for maintaining secrecy of communications. One well-known technique for generating ciphertext from "cleartext" messages is the use of substitution systems. In such systems, letters or symbols that comprise the message are replaced by some other symbols in accordance with a predetermined "key". The resulting substituted message is a cipher which is expected to be secret and hopefully cannot be understood without knowledge of the secret key. A particular advantage of substitution in accordance with a prescribed key is that the deciphering operation is easily implemented by a reverse application of the key. A common implementation of substitution techniques may be found in ciphering-wheel devices, for example, those disclosed in U.S. Pat. Nos. 2,964,856 and 2,984,700 filed Mar. 10, 1941 and Sept. 22, 1944, respectively.

Further teachings on the design and principles of more advanced substitution techniques may be found in "Communication Theory of Secrecy Systems" by C. E. Shannon, Bell System Technical Journal, Vol. 28, pages 656–715, Oct. 1949. Shannon, in his paper, presents further developments in the art of cryptography by expounding the product cipher, that is, the successive application of two or more distinctly different kinds of message-symbol transformations. One example of a product cipher consists of a symbol substitution followed by a symbol transposition.

Another well-known technique for enciphering a cleartext message communication is the use of a cipher stream sequence which is utilized to form a modulo sum with the symbols of the cleartext. The ciphered output message stream is then unintelligible if the receiver of the message does not have knowledge of the stream-generator sequence. Examples of such key generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example U.S. Pat. No. 3,522,374 filed June 12, 1967 teaches the processing of a clear-text message with a key-material generator that controls the number of cycles for enciphering and deciphering. Related to this patent is U.S. Pat. No. 3,506,783 filed June 12, 1967 which discloses the means for generating the key material which gives a very long pseudorandom sequence.

Another approach which has been utilized in the prior art for establishing secret communications is the coding of the message's electrical signal representations that are transmitted over the communication channel. This type of technique is usually more useful in preventing jamming rather than in preventing a cryptanalyst from understanding a cipher message. Exemplary systems of this type may be found in U.S. Pat. No. 3,411,089 filed June 28, 1962 and No. 3,188,390 filed June 8, 1965.

With all of the various approaches taken in the prior art, there still remains the problem of obtaining a highly secure system applicable to a data-processing environment. The problem is particularly acute if it is desired to provide a system which is not susceptible to analysis by an unauthorized individual, notwithstanding the fact that the unauthorized person has full knowledge of the computer-system structure. Furthermore, with many of the prior-art devices, the cipher may be "cracked" by having an opportunity to send specifically designed messages through the ciphering system and observing the output; e.g., sending an all-zero pattern followed by a single one bit at selective positions within the data word. None of the prior-art systems have utilized the advantages of a digital processor and its inherent speed in developing a cryptographic system which produces ciphers particularly useful in a computer-system network. That is, a cipher that is impractical to crack by trial of all possible combinations of the key, and whose ciphertext reveals no information as to the key.

OBJECTS OF THE INVENTION

Therefore, it is an object of this invention to provide a cryptographic system for developing block ciphers by a combination of nonlinear transformations.

It is another object of the present invention to provide a cryptographic system which recirculates a message block of binary data through a series of nonlinear transformations.

It is another object of the present invention to provide a cryptographic system which operates under the control of sequentially accessed groups of bits from a subscriber cipher key.

It is a further object of the present invention to provide a cryptographic system in which the key accessing schedule is followed in the same direction for both encipher and decipher operations.

SUMMARY OF THE INVENTION

This is a cryptographic system for enciphering or deciphering a thirty-two-bit block of binary data in accordance with a sixty-four-bit binary cipher key. The system operates on four bits of data in parallel, and these four-bit segments or "minibytes" are processed serially within the internal registers of the system. Both the encipher and decipher operations are controlled by a key-accessing schedule that determines which minibytes in the key are utilized to control the nonlinear transformations which are carried out to complete the cipher. The cipher system implements three basic nonlinear transformations: a modulo-16 addition, followed by a keyed substitution transformation, followed by a keyed permutation.

Modulo addition is implemented by a modulo-16 adder, whose output is a nonlinear function of selected data and key minibyte. The output function undergoes a further nonlinear transformation performed by a substitution device in which one of two possible transformations is chosen in accordance with a selected bit of the key. The substitution device output is then combined in a Boolean logic operation with a selected portion of the cipher key to generate a resulting set of bits used as inputs to sets of modulo-2 adders interposed within a plurality of convolution registers. The system transformation components as controlled by the cipher key are arranged in a manner such that the substitution device output is selectively permuted under key control during the convolution operation.

A complete ciphertext for a thirty-two-bit message block is formed by executing sixteen rounds, each round comprising four shifts of one half of the data block through the transforming structures described above resulting in a modification of the other half block, followed by an interchange cycle during which the two halves of the message block are positionally interchanged within the recirculating registers. Upon completion of the sixteen rounds, the thirty-two-bit block of information which is present in the storage cells of the internal registers of the system is transmitted.

During any one round, only one half of the message block is transformed by the cryptographic system. The remaining half of the message block remains untransformed during that round and is used in combination with selected segments of the cipher key to generate a function T(K,M) (K,M) which may be reconstructed at the receiving station during a decipher operation. The function T is utilized to transform one half of the message by means of a reversible mathematical operation, which in the preferred embodiment is modulo-2 addition. Thus, during a single round, a message block consisting of equal segments X,Y is transformed into X,Y′ in accordance with the relationship $Y'=Y*T(K,X)$, where "*" is a completely reversible mathematical operator, such as a modulo-2 addition. Reconstruction of the original message X,Y is then possible in accordance with the relationship $Y=Y'*^{-1}T(K,X)$.

Both encipher and decipher operations at a computer network terminal are performed in accordance with the same key accessing schedule, which is arranged so that in any round no key bit is used more than once. At a receiver station or CPU, encipher or decipher operations are performed in accordance with a key accessing schedule which is reverse relative to that of the terminal. During each round at the terminal, half of the message block is passed through three nonlinear transformations followed by an interchange of the newly modified sixteen bits of information. At the CPU, for each round, an interchange is performed first, followed by the reconstruction of the modified 16 bits of information.

BRIEF DESCRIPTION OF THE DRAWINGS

FIG. 2 is a table of the schedule for accessing cipher-key bit segments during the operation of the cryptographic system of FIG. 1.

DETAILED DESCRIPTION OF THE INVENTION

Figure 1:
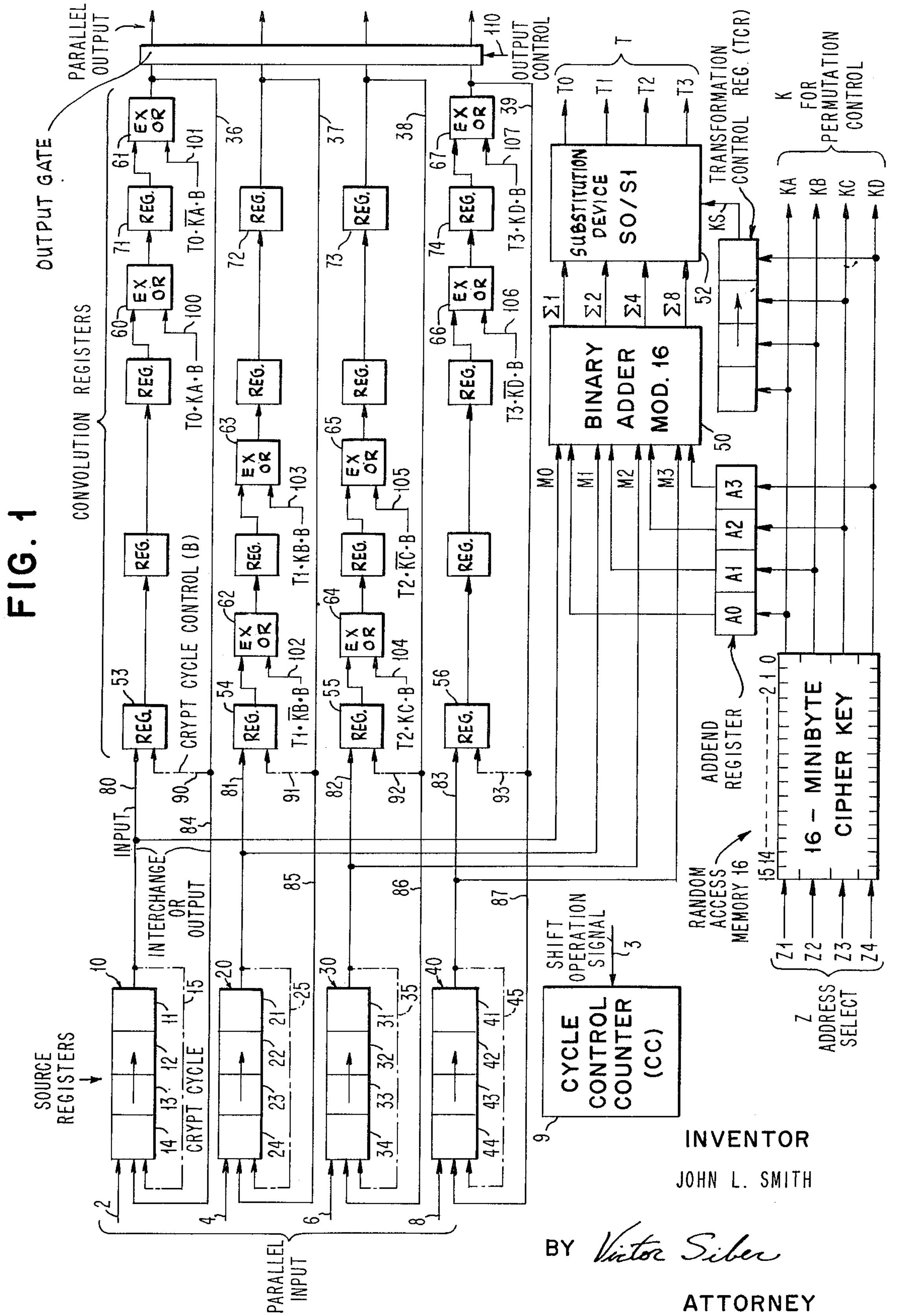
FIG. 1 is a detailed schematic diagram of the cryptographic system.
Figure 4:
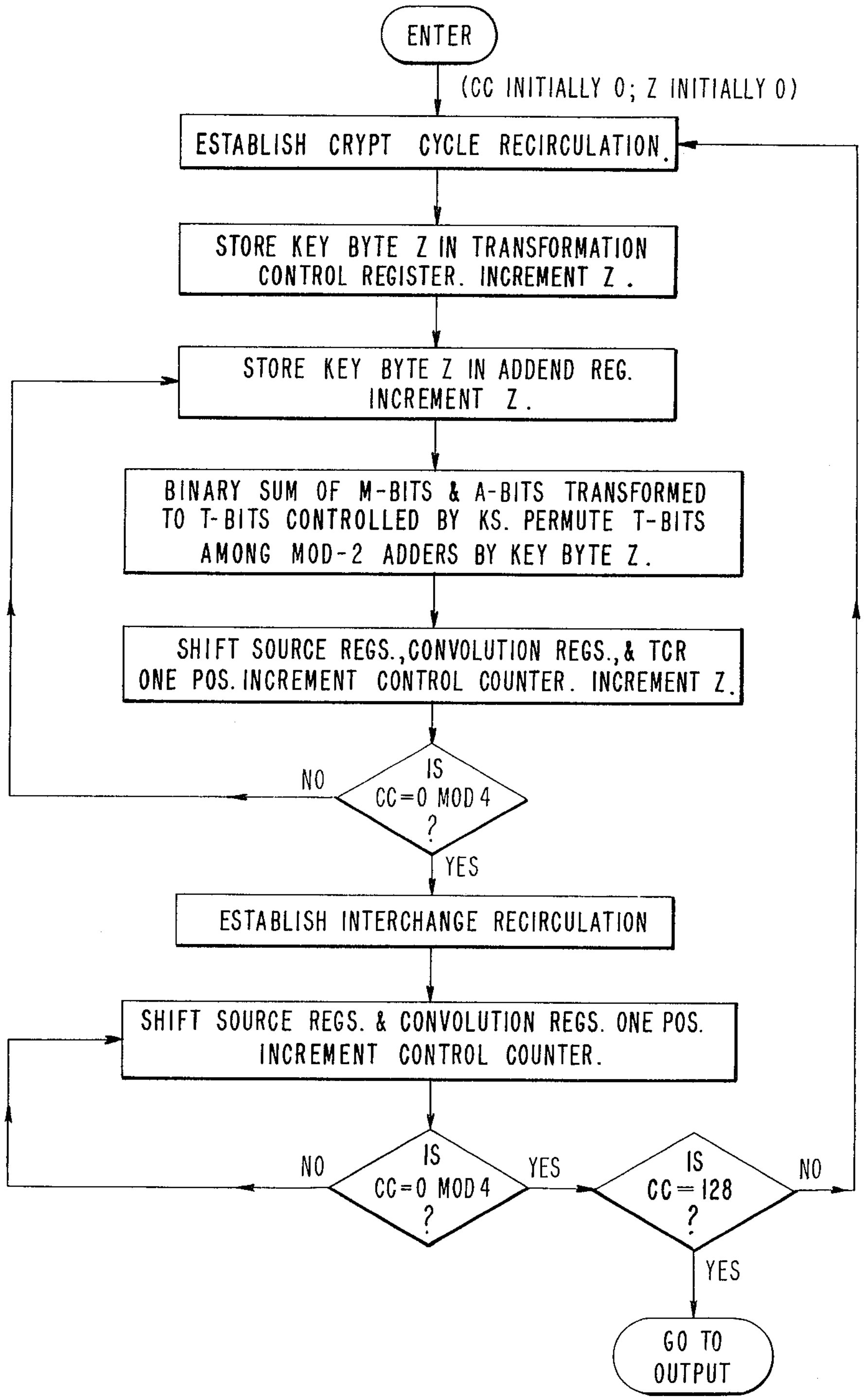
FIG. 4 is a flow diagram showing the algorithm carried out by the system of FIG. 1.

The cryptographic system shown in FIG. 1 processes a 32 bit message in accordance with the process flow chart of FIG. 4. Both enciphering and deciphering are performed by an identical process. All messages repetitively undergo three different nonlinear transformations under the control of a 64 bit cipher key which is divided into sixteen segments referred to herein as minibytes. A key-accessing schedule which is shown in FIG. 2 details the selection and routing of the minibytes during the execution of the process. The same key-accessing schedule is common to both terminals and CPU's within a computer network, with the distinction that reference to the schedule is done in an inverse manner for the terminal relative to the CPU. As shown in FIG. 2, both encipher and decipher at the terminal are performed by reading the schedule from left to right and from top to bottom, whereas at the CPU the reading is performed from left to right and from bottom to top. It should be recognized that the schedules of the terminal and CPU may be interchanged without affecting the process, and that any transmitter-receiver pair must operate with mutually reverse schedules.

The 16 minibytes of the cipher key are identified by minityte addresses zero through 15 and are available in a random-access memory 16. Memory 16 may be implemented by any well known data-storage device such as core memory, solid-state memory, or any other storage medium capable of maintaining 64 bits of information and sequentially providing rapid access to any four-bit segment in accordance with a four-bit Z address.

For the purpose of facilitating the understanding of the invention, the following terms are defined:

SHIFT OPERATION - The movement of binary information by one bit position (to the right) in the shift registers within the cryptographic device, conditioned by the particular recirculation paths which may be established among the various output lines and input lines of these registers.

CRYPT CYCLE - The performing of the triplet of transformation functions on each of the four-bit minibytes in one half of the message block and the convolution of the results of these transformations with the other half of the block; for the sequential execution of these processes, four shift operations are performed.

INTERCHANGE CYCLE - The performing of four shift operations, with recirculation paths established among the registers in a manner such that the positional interchange of the two halves of a block results.

ROUND - The performing of a crypt cycle followed by an interchange cycle.

The operation of the cryptographic system can best be understood by reference to FIGS. 1, 2 and 4. As discussed above, the cryptographic system doe not distinguish between an encipher or decipher mode of operation and may be present in either a transmitting or receiving station within a data-processing network.

Exemplary applications of cryptographic systems are fully disclosed in U.S. patent applications Ser. Nos. 158,138; 158,360; and 158,174. For the purpose of simplifying the description of the instant cryptographic system, the following discussion is in terms of an encipher operation. However, it should be recognized that the following description also applies to a decipher operation since the system does not distinguish between encipher and decipher.

In order to begin the cryptographic ciphering process the 32-bit message is introduced four bits at a time along parallel input lines 2, 4, 6, and 8. Since the device operates on thirty-two-bit blocks, eight minibytes are introduced in parallel sequentially by means of input lines 2, 4, 6, and 8. As successive minibytes are loaded in, the binary digits which are present in the source and the convolution registers are shifted over towards the right one bit at a time. After eight successive minibytes are shifted into the registers, all storage locations of the source and convolution registers contain the binary information that forms one block of the message. During the loading operation, lines 80, 81, 82 and 83 are operative so as to interconnect the source and convolution registers. At the same time, the register feedback lines 15, 25, 35, 45 and 36–39 of the source and convolution registers are disengaged. Thus, no information would be flowing along lines 15, 25, 35, 45, and 36–39. Effectively, each pair of source and convolution registers appears as an eight-bit shift register during the loading stage.

After the message is completely entered into the registers, the process as shown in FIG. 4 is ready to begin. Initially, the cycle control counter (CC) 9 is set to zero. The cycle control counter 9 consists of seven-bit binary counter which is incremented by a value of one for every shift operation that takes place, until a value of 128 is detected in the counter (by means not shown) at which time the encipher or decipher operation is complete. Then, upon completion, the thirty-two-bit message text in the sets of registers is ready for processing or transmission. The cycle control counter 9 monitors each shift operation by means of the shift operation signal 3 which presents a binary one signal for every shift executed within the cryptographic system.

As indicated previously, the entire cryptographic process operates under the control of a sixteen-minibyte cipher key. The sixty-four-bit block of binary information which represents a unique subscriber key is stored in a random-access storage device 16, from which minibytes are then accessed in accordance with the Z address that is formulated from the key accessing schedule shown in FIG. 2. Thus, for example, if the minibyte at address fifteen (addresses are illustrated by numbers 0–15 at the top of memory 16) is to be accessed and output along lines KA, KB, KC and KD, the hexadecimal input 21, 22, 23, 24 to the random-access memory 16 will consist of four binary one signals along the Z address lines. The lines 21–24 represent decimal value of one, two, four and eight. Similarly, any of the other 15 minibytes may be selected and presented along KA, KB, KC and KD in accordance with the hexadecimal number input that represents the Z address. Since random-access memory structures are well known in the art, no further explanation is considered to be necessary at this point.

After initialization, the crypt-cycle recirculation lines 15, 25, 35, 45, 90, 91, 92 and 93 are activated and lines 80-83 are deactivated so that the source registers and the convolution registers become recirculating registers. That is, for every shift operation, the right-most bit of each register is sent back along the crypt-cycle lines to the left-most storage location of the same register.

Referring again to FIG. 2, it is seen that in round 1, the first Z address which is selected is zero. Thus, minibyte zero is presented along lines KA, KB, KC, and KD. This minibyte zero is loaded into the transformation control register (TCR). The TCR is initially loaded with a new minibyte at the beginning of each crypt cycle. After the minibyte is loaded, the TCR shift register contains four control bits which are then presented sequentially one bit at a time during each shift operation within the crypt cycle.

The right-most bit of the TCR, identified as KS, is input to substitution device 52 which performs a nonlinear transformation on the output of binary adder 52 so as to generate substitution signals T0, T1, T2, and T3. Subsequent to the loading of the TCR, the Z address selects minibyte one which is loaded into the addend register which in turn provides an input to binary adder 50. This adder 50 performs a modulo-16 addition of the addend register information A0, A1, A2 and A3 with the output of the source registers M0, M1, M2, and M3 for providing sum output signals Σ1, Σ2, Σ3 and Σ4. Binary adder 50 may be implemented by any conventional adder circuit for developing a modulo-16 sum. This addition step provides a nonlinear transformation for every four bits of message information that is to be enciphered.

The substitution output signals T are a function of selected minibytes of the cipher key and of message bits M1, M2, M3, and M4. The selected minibytes of the key are identified by the key accessing schedule of FIG. 2 and are utilized to generate the function T=T(K,M) by means of adder 50 and substitution device 52. After the function T is constructed, its constituent binary signals T0, T1, T2, and T3 are all used to modify and transform the half of the message block which appears in the convolution register. Transformation is in accordance with a reversible modulo-2 operator, which is implemented by means of exclusive-or gates 60–67. The exclusive-or gates 60–67 are interposed between the storage cells of the convolution registers, each such register having a pair of gates 60–61, 62–63, 64–65, 66–67, which are mutually exclusively made operative during any one shift operation. It should be recognized that the placement of the exclusive-or gates 60–67 within the convolution registers is a matter of design choice.

Referring again to the key accessing schedule of FIG. 2, it is seen that the Z address next selected is two, which is utilized for the permutation control. Minibyte two is presented along lines KA, KB, KC, and KD and is combined in accordance with the Boolean logic function shown as input on lines 100 through 107. For the purpose of simplicity, the Boolean logic functions for carrying out the control inputs on lines 100 through 107 are shown in the form of Boolean-algebraic expressions. It should be recognized that each of these functions are illustrative and represent a circuit gate which provides an AND function of the T, K and B signal values. The K permutation-control signals are presented both in their true and complemented form as shown in FIG. 1. The crypt-cycle control signal B alwasy has a binary value of one during the crypt cycles and is set to zero during all other times. When control signal B is equal to binary zero the modulo-two adders 60 through 67 are effectively removed from operation within the convolution registers.

With the TCR and the addend register loaded with minibytes zero and one respectively, and with the Z address now selecting permutation-control minibyte two for selection of the appropriate permutation in the convolution registers, the cryptographic device is ready for the first shift. At this point in time, binary adder 50 and substitution device 52 have operated in sequence to cause two successive nonlinear transformations on four bits of message which appears at the right-most bit of each of the source registers 10, 20, 30 and 40. The output of substitution device 52 is a parallel four-bit transformed minibyte, represented by T, which is presented to the exclusive-or gates 60 through 67 whose outputs are utilized during the ensuing shift operation. Note that only one out of each pair of exclusive-or gates within each convolution registers is operative for any one shift. This is assured by the use of the true and inverse permutation control signals K.

The T bits now having been generated, the source registers and convolution registers and also the transformation control register TCR are caused to shift one position to the right under the control of shift operation signal 3. Since the crypt-cycle control signal B is in a binary one condition at this time, the crypt-cycle recirculation lines 15, 25, 35, 45, 90, 91, 92 and 93 are engaged and lines 80–83 are disengaged so that the right-most bits in the convolution and source registers are recirculated back to the left-most storage positions in each of the registers. During the shift, shift operation signal line 3 provides an input to the cycle control counter 9 which keeps track of the number of cumulative shifts taken during the rounds. Cycle control counter 9 consists of a seven-bit binary counter which counts up to a quantity of 128.

The first quarter of the shift cycle of round one now being complete, the control counter 9 is tested to see if four shifts have taken place. Since the answer to the test at this time is negative, the test as to whether CC is equal to zero mod 4 results in a "no" condition indicating that the Z address should select the next key minibytes for the addend register and permutation control. In this case, minibytes three and four are selected in accordance with the key accessing schedule of FIG. 2. Meanwhile, since the transformation control register has been shifted one position to the right, there is presented a new KS control signal bit to the substitution device 52. Then, a second shift operation is performed and the appropriate count is made in cycle control counter 9.

In a manner similar to the first two shifts, a total of four shifts are taken during round one thus completing the crypt cycle. The fourth time the control counter 9 is tested for zero modulo–4, the decision will be "yes", and therefore, an interchange cycle will be carried out.

The interchange portion of the round consists of the transfer of information between the convolution registers and the source registers. This interchange is implemented by presenting a zero on crypt-cycle control line B. Thus, the crypt cycle lines 15, 25, 35, 45, 90, 91, 92 and 93 are disengaged, and lines 80–83 are engaged. Also, the exclusive-or gates 60 through 67 are effectively removed from the convolution registers by the fact that a zero signal appears on lines 100 through 107. With signal B equal to zero the source registers and the convolution registers appear as a group of four eight-bit recirculating shift registers. Thus, by performing four shift operations, the information in the source registers can be interchanged with the information in the convolution registers by means of recirculation paths 80 through 87. Each shift taken during the interchange cycle increments the cycle control counter 9 by one. Thus, when the CC is tested for zero modulo 4 the resulting "yes" answer will indicate that a further test as to whether CC equals 128 should be performed. At the completion of round 1, the CC will not equal 128, and therefore the process continues by beginning round number two.

In a similar manner as discussed above, all 16 rounds are executed. After the last interchange at the completion of round 16, the test as to whether CC equals 128 will be "yes" and accordingly, the cipher operation is complete. At this point, the complete message appears in the storage locations within the source registers and convolution registers, and the message is then transmitted in parallel as a four-bit output from the convolution registers. Again, the crypt-cycle control signal B is set to zero so that the source-register and convolution-register pairs are connected to each other to form four eight-bit shift registers. Output control 110 controls the sequential gating of the four bits of information appearing on the output stages of the convolution registers 71, 72, 73 and 74 so as to provide a thirty-two-bit block of data which is either ciphertext to be transmitted or cleartext which is to be processed. In order to minimize processing time, simultaneously with the output of information under the direction of output control 110, a new message can be loaded into the cryptographic system by means of the parallel input to the source registers. At the completion of eight shifts, the cryptographic system is ready to begin an encipher or decipher operation on the next message block. The cycle control counter 9 is inoperative during the input/output phase.

Figure 3:
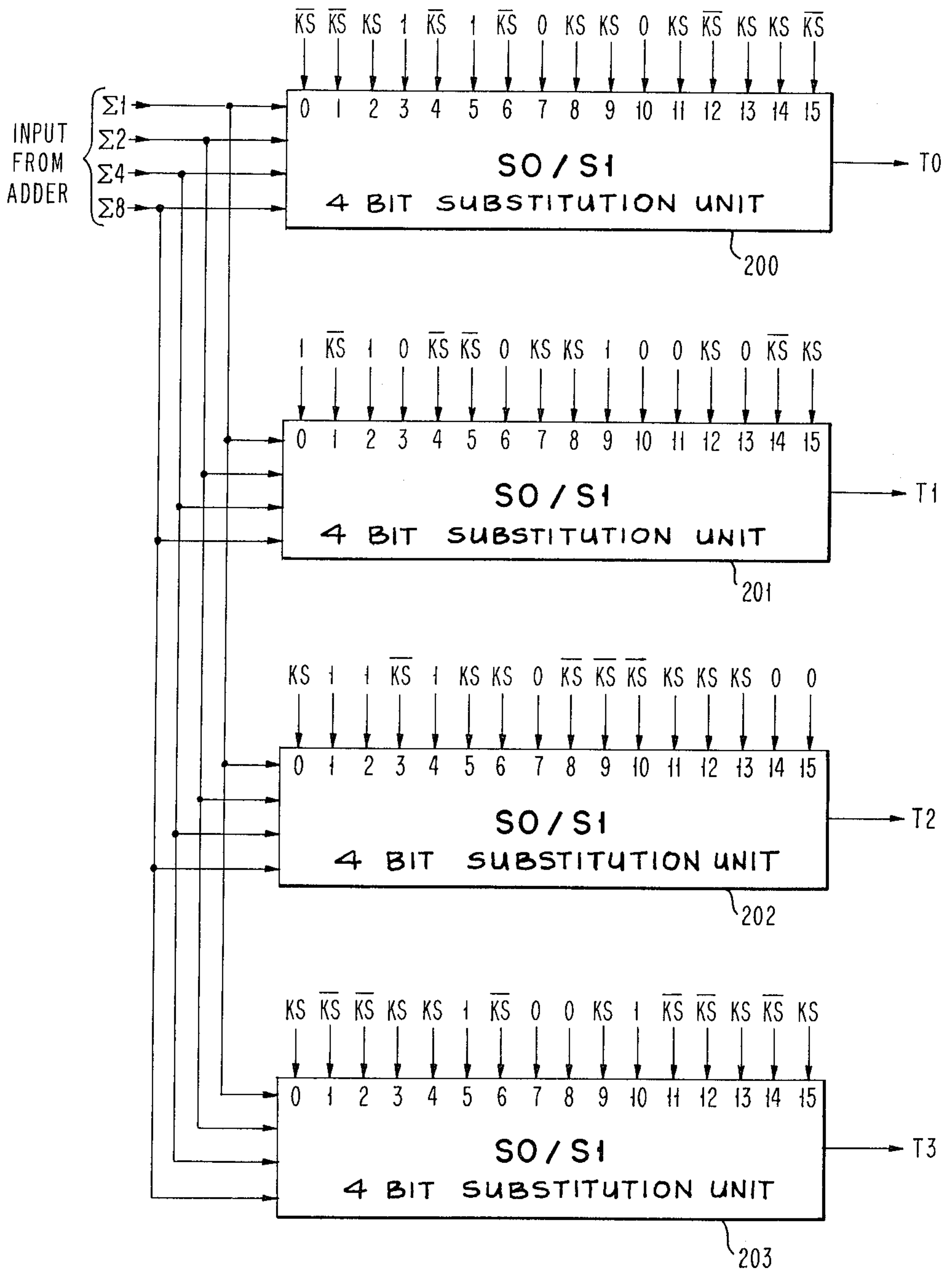
FIG. 3 is a more detailed block diagram of the substitution device down in FIG. 1.

Now referring to FIG. 3, there is shown a more detailed diagram of the substitution device 52. The S0/S1 substitution device 52 performs a nonlinear transformation on the four-bit output of the binary adder 50 and provides a transformed four-bit output identified as T0, T1, T2 and T3, The substitution device 52 consists of four bit-substitution units 200 through 203, each generating one of the T0 through T3 bits in accordance with the hexadecimal number represented by the input 204 from the adder 50. Each of the bit-substitution devices has 16 inputs derived from the transformation control signal KS and its inverse $\overline{KS}$ and from prewired 0 and 1 bit values. The bit substitution devices 200 through 203 are prewired so as to select one out of 16 inputs in accordance with the bit pattern present on the four input lines 204 which emanate from the adder 52. If, for example, all the input lines contained a one bit, then all of the bit-substitution devices 200 through 203 would select the fifteenth input line to gate to the output T0 through T3 lines. Since each of the bit-substitution devices 200 through 203 are wired differently with respect to the combination of KS, $\overline{KS}$, and 0 and 1 bit lines, the combined T output of the substitution devices provide one out of sixteen possible values. It should be recognized by those skilled in the art, that the specific implementation of the subsitution device may be carried out in numerous ways. For example, U.S. patent application Ser. No. 158,360 shows an alternative approach for carrying out a similar function.

While the invention has been particularly shown and described with reference to the preferred embodiment hereof, it will be understood by those skilled in the art that several changes in form and detail may be made without departing from the spirit and scope of the invention. For example, the modulo–2 logic function interposed within the convolution registers maybe substituted by other more complex reversible logic transformations. Furthermore, the particular logic functions may be distributed throughout the convolution registers.

While the invention has been described in terms of a thirty two-bit message to be enciphered or deciphered under the control of a sixth four-bit cipher key, it should be recognized by those skilled in the art that the encipher/decipher process is not limited to any specific message or key size.

It should also be recognized by those skilled in the art that, while the specific embodiment disclosed herein for carrying out the encipher/decipher process of FIG. 4 is a hardware structure, the concepts presented are capable of being implemented by program means executable on either a special purpose or a general purpose computer. The selection of hardware or software means is a trade-off decision dependent on the cost-performance factors of the network. It is also possible to implement the terminal cryptographic device in terms of hardware and have it interface with a central processing unit having completely software means for carrying out the cryptographic process within a general purpose computer.

What is claimed is:

1. A cryptographic system for enciphering or deciphering a block message consisting of, *n*, binary digits, under the control of a block cipher key consisting of, *k*, binary digits, the constituent digits of said message being grouped into segments having, *p*, binary digits, said system comprising:

means for loading a first group of message segments into a first store means and a second group of message segments into a second store means;

said first and second store means being formed from a plurality of storage cells;

means connected to the output of said first store means for generating a plurality of transformed signals, T, that are a function of said first group of message segments and selected binary digits of said cipher key;

a plurality of logic means interposed between the storage cells of said second store means for combining signals of said second message segments with said transformed signals, T, by a reversible mathematical operation;

said logic means being made selectively operative by the binary values of selected key digits, K, which in combination with a control signal gate the, T, signals to said plurality of logic means.

2. The system as defined in claim 1 wherein said means for generating transformed signals, T, comprises:

nonlinear transformation means for effecting a keyed substitution of said first group of message segments.

3. The system as defined in claim 2 further comprising:

third store means for maintainig said cipher key and presenting selected key digits on a plurality of, K, output lines;

selection means for causing said third store means to present identified key segments on said, K, output lines in accordance with a key digit accessing schedule.

4. The system as defined in claim 3 further comprising adder means for performing a modulo addition on information contained in said first and third store means and providing the sum, Σ, to said nonlinear transformation means

5. The system as defined in claim 4 further comprising interchange means for interchanging the contents of said first and second store means.

6. The system as defined in claim 5 wherein each of said logic means comprises an exclusive-or gate for performing a modulo–2 addition of said, T, signals and the binary signal values contained in the store cells connected to said exclusive-or gate.

7. The system as defined in claim 6 wherein said second store means comprises:

a plurality of recirculating shift registers, each register having associated therewith a set of logic means interposed between storage cells within the register;

said logic means being selectively made operative by the binary values of selected digits of said cipher key so that at least one of said exclusive-or gates in each of said sets of logic means is operative when said shift registers are caused to shift their contents.

8. The system as defined in claim 7 further comprising counter means for counting the number of shift cycles performed by said recirculating shift registers so to enable the determination of when said interchange means is to be made operative and for enabling determination as to when said cryptographic system has completed an encipher or decipher operation.

9. An automatic process for enciphering or deciphering a block message consisting of, $n$, binary digits, under the control of a block cipher key consisting of, $k$, binary digits, said binary message digits being grouped into, $p$, digit segments, said process comprising the steps of:

loading a first group of message segments into a first storage location and a second group of message segments into a second storage location;

generating a plurality of transformed signals, T, as a nonlinear function of said first group of message segments and the binary values of selected digits of said cipher key;

permuting said, T, signals as a function of the binary value of selected digits of said cipher key, K,;

combining the permuted, T, signals with a control signal for selectively controlling a reversible mathematical operation performed on message segments contained in said second storage location;

interchanging the contents of said first storage location with the contents of said second storage location;

repeating the above steps for a specified number of rounds;

whereby the final transformed message that appears in said first and second storage locations is a complex function of key and message binary signal values.

* * * * *